United States Patent
McDonald et al.

(10) Patent No.: US 6,442,166 B1
(45) Date of Patent: Aug. 27, 2002

(54) VARIATION FLUCTUATION SMOOTHING (VFS) FOR ATM CIRCUIT EMULATION

(75) Inventors: David McDonald, Ottawa; Raymond Rui-Feng Liao, North York; Natalie Giroux, Hull, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/230,037

(22) PCT Filed: Jul. 17, 1997

(86) PCT No.: PCT/CA97/00518
§ 371 (c)(1),
(2), (4) Date: Sep. 27, 1999

(87) PCT Pub. No.: WO98/04098
PCT Pub. Date: Jan. 29, 1998

(30) Foreign Application Priority Data

Jul. 17, 1996 (GB) .............................................. 9614985

(51) Int. Cl.[7] .............................................. H04Q 11/04
(52) U.S. Cl. ............................ 370/395.42; 370/395.41; 370/412; 370/429
(58) Field of Search ................................. 370/229, 230, 370/231, 232, 233, 234, 235, 252, 253, 395, 396, 397, 398, 399, 412, 428, 429, 433, 434, 395.1, 395.4, 395.41, 395.42, 395.43, 395.53

(56) References Cited

U.S. PATENT DOCUMENTS

| | | | | |
|---|---|---|---|---|
| 5,649,110 A | * | 7/1997 | Ben-Num et al. | 370/229 |
| 5,751,709 A | * | 5/1998 | Rathnavelu | 370/395 |
| 5,914,934 A | * | 6/1999 | Rathnavelu | 370/229 |
| 6,064,677 A | * | 5/2000 | Kappler et al. | 370/414 |
| 6,198,724 B1 | * | 3/2001 | Lam et al. | 370/233 |

* cited by examiner

Primary Examiner—Ricky Ngo
(74) Attorney, Agent, or Firm—Marks & Clerk

(57) ABSTRACT

A method of scheduling cells into an asynchronous network for a circuit emulation service, comprises estimating the virtual clock of each connection by on-line traffic measurement, determining the lateness of the head-of-the-line cell for each connection, and giving highest priority to the latest cell.

12 Claims, 3 Drawing Sheets

VARIATION FLUCTUATION SMOOTHING (VFS) FOR ATM CIRCUIT EMULATION

This invention relates to packet-based asynchronous networks, and in particular to a circuit emulation service (CES) therefor.

Packet switching offers several performance advantages over circuit switching, particularly with regard to efficient utilization of available bandwidth. Recent advances in Constant Bit Rate services have enabled speech to be transmitted over switched virtual circuits through a packet-based network. CES offers backward compatibility between existing circuit-switched telephony services and asynchronous transfer mode (ATM) technology.

Meeting the quality of service requirements of CES is not a trivial task. The cell delay variation (CDV) between successive cells of a connection has to be minimized to reduce the size of the play-out buffer at the receiver end, while the cell transfer delay (CTD) has to be constrained to be no larger than the delay in the circuit-switched CES cells (or, in general, CBR or Constant Bit Rate cells) are generated at regular intervals. Ideally CES cells from the same connection should follow each other through the switch at regular intervals as if according to a virtual clock. However clock wander is ubiquitous, so an asynchronous CES connection can have an effective cell assembly rate different from the nominal assembly rate and this effective assembly rate is usually unknown to the scheduler. This means the virtual clock for each connection may be either fast or slow. This introduces CDV at the ATM network access point.

Another main cause of CDV is the cell contention caused by simultaneous arrivals at ATM multiplexing points. This adds extra CDV across the ATM network.

Unless the CDV is absorbed in an upstream shaping buffer (at the cost of increasing the CTD), the downstream node will perceive additional jitter.

Currently, some simple cell scheduling algorithms, such as First-In-First-Out (FIFO) and round-robin are used in the ATM networks, but they do not optimize CDV performance. One algorithm, the Earliest-Deadline-First (EDF) service discipline, has been proposed to reduce CDV for the packet voice services, see T. Chen, J. Wairand, and D. Messerschmitt, *Dynamic Priority Protocols for Packet Voice*. IEEE Journal on Selected Areas in Communications, Vol. 7, No.5, pp. 632–643, June 1989.

EDF can minimize the CDV if a cell's deadline can be accurately calculated. However, since the deadline for each connection is determined by the unknown connection time clock (time stamps in ATM cells to carry a play-out deadline are not practical), EDF is not applicable.

U.S. Pat. No. 5,515,363 discloses a technique for determining the lateness of the head-of-the-line cell and assigning priority for transmission to the latest cell in an asynchronous network providing a CES service. A similar technique is disclosed in PROCEEDINGS OF THE IEEE CONFERENCE ON COMPUTER COMMUNICATIONS 1966 (INFOCOM '96), vol. 2, Mar. 24, 1966, San Francisco, US; pages 647–654 (VISHNU et al.). This technique is designed to guarantee a minimum specified bandwidth to each backlogged virtual connection IEEE GLOBAL TELECOMMUNICATIONS CONFERENCE 1995 (GLOBECOM '95), VOL.2, Nov. 14, 1995, Singapore; pages 1064–1070 (PANCHA et al.) discloses a technique for minimizing delay in packet switched networks.

Such techniques, however, are not able to adapt to slow drift in the virtual clock or take into account cell jitter, which is inevitably present in an ATM network.

According to the present invention there is provided a method of scheduling cells received at a queueing module provided for each connection into an asynchronous network for a circuit emulation service CES, comprising establishing the virtual clock of each connection by on-line traffic measurement in real time, estimating the lateness of the head-of-the-line cell for each queue relative to a deadline for departure of that cell determined by the established virtual clock by means of a moving window filter able to adapt to the slow drift in the virtual clock and at the same time smooth the variations caused by jitter due to cell contention, and giving the highest priority for transmission to the cell having the largest lateness value.

By attempting to match connection cell departures to a virtual clock, the above method overcomes both of the root causes for CDV and optimizes the CDV performance for ATM CES.

The above scheme has little computational overhead and requires only a few memory locations per CES stream. It can be implemented in a traffic shaper with minimum extra hardware requirements, or in a Segmentation And Reassemble (SAR) device for ATM CES. A simulator of VFS has been built and tested under realistic traffic conditions. VFS consistently out-perform the FIFO discipline under both transient and steady traffic conditions.

The invention thus proposes to estimate cell lateness relative to a deadline established by a virtual clock associated with each connection. The estimate is based on real-time measurements. This estimate is fed into the EDF scheduler which identifies the latest cell which gets highest priority for transmission.

The invention also provides a device for scheduling cells into an asynchronous network for providing a circuit emulation service CES, comprising a queueing module for each connection receiving incoming cells, a relative lateness estimator connected to said queueing module for estimating the relative lateness on a per connection basis of the head-of-the-line cell for each queue relative to a deadline for departure of that cell determined by a virtual clock established for that connection by means of a moving window filter able to adapt to the slow drift in the virtual clock and at the same time smooth the variations caused by jitter due to cell contention, and an earliest deadline first unit connected to said lateness estimator for transmitting outgoing cells and giving highest priority to the cell having the largest lateness value.

The invention will now be described in more detail, by way of example, only with reference to the accompanying drawings, in which.

Figure 1:
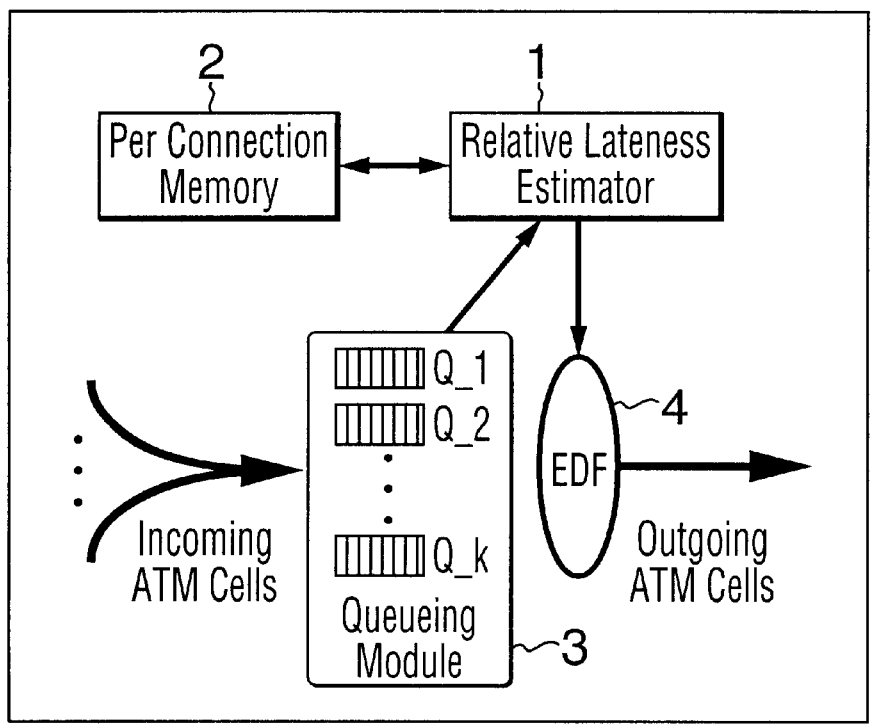
FIG. 1 depicts the high level structure of the Variation Fluctuation Smooth(VFS) scheme.

FIG. 1 depicts the high level structure of the Variation Fluctuation Smoothing (VFS) device. It comprises a Relative Lateness Estimator 1 with per-connection (or per-cell) memory 2, per-connection queuing module 3, and an Earliest-Deadline-First scheduler 4, which sends the cell with the largest relative lateness among all the cells queued at the head of the line.

An important feature of the Variation Fluctuation Smoothing (VFS) scheme is the concept of lateness relative to a virtual clock. Relative Lateness Estimators are known which use online traffic measurements to estimate a cell's lateness for transmission. The Relative Lateness Estimator 1 should be able to adapt to the slow drift in the virtual clock and at the same time smooth the relatively frequent variations caused by jitter due to cell contention. This calls for a moving window filter.

One implementation of this filter is a exponential moving window. Let $D_N$ be the timing deviation for an individual cell N. Then the Relative Lateness of the Nth cell, $L_N$, is estimated recursively by $$L_N = D_N + \alpha L_{N-1} \quad (1)$$

The exponential parameter a determines the effective window size of the filter. If the effective window size W is defined to be the point where the exponential weight decreases to 1%, namely $a^W = 0.01$, then a=0.99 gives W=459. The timing deviation for a single cell, $D_N$, can be calculated either when the cell arrives or when it is scheduled to leave. This freedom generates two implementations of VFS.

For VFS with $D_N$ calculated at the cell arrival instant $t=a_N$, where t is the current clock time and $a_N$ is the cell arrival time, $D_N$ can be presented as:

$$D_N = a_N - a_{N-1} - T = t - a_{N-1} - T$$

where T denotes the nominal cell assembly time (or cell transmission time).

The procedure for the VFS with $D_N$ calculated at the instant of arrival is:

1) Keep the relative lateness of the last cell $L_{N-1}$ in per-connection memory.
2) When the next cell (cell N) arrives, calculate its lateness $L_N$ by multiplying $L_{N-1}$ by $\alpha$ and then adding $((\alpha_N - \alpha_{N-1}) - T)$. Store $L_N$ and $a_N$ in the per-cell memory. Update the per-connection memory with $L_N$.
3) When this cell is at the head of the line, its current lateness is calculated by adding the waiting time to $L_N$, giving $(L_N + (t - \alpha_N))$. Since t is common for all the head of line cells, it can be ignored and the lateness for comparison can be defined by $L'_N = L_N - \alpha_N$.
4) Finally the lateness $L'_N$ of the head of the line cell from each of the CES streams is compared and the one with the largest lateness is sent.

For VFS with $D_N$ calculated at the instant of cell departure $t=d_N$, $D_N$ can be presented as:

$$D_N = d_N - d_{N-1} - T = t - d_{N-1} - T$$

The procedure for the VFS with $D_N$ calculated at cell departure times is:

1) Keep the relative lateness $L_{N-1}$ and the departure time $d_{N-1}$ of the last cell at the head of line in per-connection memory.
2) When the next cell (cell N) is at the head of line position, its current lateness is: $\alpha L_{N-1} + D_N = \alpha L_{N-1} + (t - d_{N-1} - T)$. Since t is common for each CES stream, we store instead $L'_N = \alpha L_{N-1} - d_{N-1} - T$ for this connection.
3) Then the $L'_N$ of each CES stream is compared and the one with the largest value is sent.
4) Finally, update the memory of relative lateness of this stream with $L_N = t + L'_N$, update the departure time of this stream with $d_N = t$.

The VFS algorithm where $D_N$ is calculated based on cell arrival times provides better precision in estimating lateness. On the other hand, the VFS with $D_N$ calculated at the cell departure times simplifies the implementation by only requiring per-connection memory. It can be shown in that $L_N$ is an exponentially weighted least squares estimator of the relative lateness of cell N. $L_N$ has a bias because of clock drift. The size of the bias is $d/(1-\alpha)$ where T+d is the assembly time for cells from this connection. The standard deviation of the estimator is of order $\sigma_j \sqrt{(1-\alpha)}$ where $\sigma_j$ is the standard deviation of the jitter. The value of a must be chosen to keep both these errors small.

There are some other enhanced versions of the VFS scheme. The bias in the estimate of relative lateness can be reduced by recursively estimating d and replacing T by T+d in the above algorithms. This would allows the moving window size of the filter to be increased and the standard deviation of the estimate to be decreased. Idle periods in the cell stream can be accommodated by skipping over the missing cell and slightly modifying the Lateness estimation. These implementations improve the performance of the lateness estimation but also increase system complexity.

A prototype of the VFS scheme has been built in simulation. The Timing Deviation of a cell $D_N$ was calculated at cell arrival time. The First-In-First-Out (FIFO) procedure and the prototyped VFS procedure was then compared. The incoming traffic load on a multiplexer comprised 28 DS1 streams. To model the clock drift the cell assembly time for each stream was determined by the nominal DS1 rate of 1.544 Mbits per second plus a value randomly chosen from (150 bit/s, 150 bit/s). An additional 50 $\mu$s was added to the cell arrival time to model the jitter. To model the system realistically, additional high priority Control cells were sent to perturb the regular servicing of the CES streams. The control cells were sent in a Markovian On-Off pattern with a peak rate equal to the DS1 rate and a sustainable rate of 0.5% of DS1 rate with a mean burst size of 3 cells. The link rate was 53 Mbits per second so one time slot is 8 $\mu$ls.

Since d is roughly 0.01 time slots and $\sigma_j$ is roughly 5 time slots, then a=0.99 is a practical choice for keeping both the bias and the standard deviation of the Estimate of Relative Lateness fairly small.

A control stream of high priority cells is modeled by a timed slotted Markov modulated process. The mean size of a burst of cells is three cells. These are sent at the nominal DS1 rate; i.e. one every 250 microseconds. The SCR is fixed so that the mean silence period is 599*250 microseconds.

The rate of the multiplexer is 125000 cells per second or one cell every 0.000008 seconds which corresponds to a link rate of 53000000 bps. This means the multiplexer works at about 90 percent capacity. The multiplexer gives highest priority to Control traffic. If the FIFO policy is followed, the DS1 cells are sent down the link in the order of arrival. If the VFS (Variation Fluctuation Smoothing) algorithm is followed, each DS1 cell has an associated lateness. The DS1 cell which is latest has highest priority.

As a general rule variability leads to delay. Since circuit emulation traffic is generated according to a clock it is advantageous to synchronize the inter departure times of cells from a DS1 stream with this clock. Ideally the clock times for each DS1 stream are uniformly spread over the 250 microsecond nominal DS1 assembly time. Unfortunately because of drift several clocks may be set to generate cells almost at the same time. Moreover jitter will shuffle the order of arrivals. The VFS policy attempts to send out DS1 cells out at the clock time as estimated by observing the last 100 or so arrival times of the same DS1.

The model for the generation times of DS1 cells is $$Y_n = a + (250 + d)n + J_n$$

where d is the clock drift, a is the initial clock time displacement and $J_n$ is the jitter. It is assumed that a is uniformly distributed over 0 to 250 microseconds. Since in general drift will cause about one extra cell per second, d is uniformly distributed over 250/4000 microseconds. Hence d is substantially smaller than the clock time displacement. Finally the jitter $J_n$ is assumed to be uniformly distributed over −50 to 50 microseconds. We could also assume the jitter is normally distributed without changing our analysis.

It is impractical to try to estimate a when n grows into the millions. The initial clock displacement is not relevant when there is so much variation an rounding error in measuring the arrival times $J_n$. Instead it is better to take a retrospective approach. Let N be fixed to be large and let's look at the arrival times of DS1 cells relative to the arrival time $Y_N$.

Figure 2:
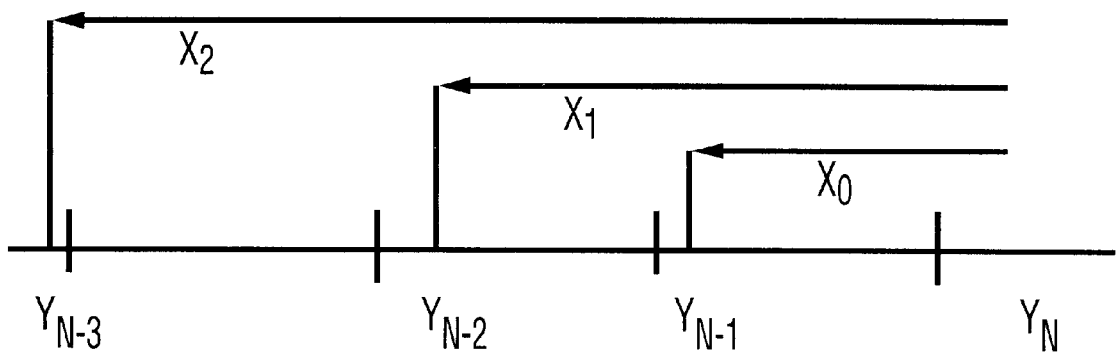
FIG. 2 shows the arrival times of DS1 cells.

As shown in FIG. 2, the clock times are equally spaced and marked by a vertical line. We see for instance that cell N−3 is late but cell N−2 is early at the time of arrival.

Let $X_m = Y_N - Y_{N-m}$. The model for the past inter arrival times is $$X_m = (\alpha + (250+d)N + J_N) - (\alpha + (250+d)(N-m) + J_{N-m}) = ((250+d)m - J_{N-m}) + J_N = ((250+d)m + E_m) + b$$

where $E_m$ is distributed like jitter and b is lateness of cell N from the clock time. This is a regression model with unknown slope d and unknown intercept b. We wish to estimate the lateness of a cell N at its arrival time; that is we want to estimate b. Since d is so small we will ignore it for the moment. Now our regression model is $$X_m \, b + 250m + E_m.$$

We shall use an exponential moving average estimate for b. That is we shall pick b to minimize the weighted sum of squares $$WSS(b) = \frac{(1-\alpha)}{\alpha} \sum_{m=1}^{\infty} (X_m - (250m + b))^2 \alpha^m$$

The least squares estimate for b is $$\hat{b} = \frac{(1-\alpha)}{\alpha} \sum_{m=1}^{\infty} (X_m - 250m) \alpha^m.$$

We can make this into a recursive estimate by calling the above lateness $L_N$ and then remarking that $$L_N = \frac{(1-\alpha)}{\alpha}((Y_N - Y_{N-1}) - 250)\alpha$$

$$\frac{(1-\alpha)}{\alpha} \sum_{m=2}^{\infty} ((Y_N - Y_{N-1}) - 250 + Y_{N-1} - Y_{N-m} - 250(m-1))\alpha^m$$

$$= ((Y_N - Y_{N-1}) - 250) + \alpha \frac{(1-\alpha)}{\alpha} \sum_{m=2}^{\infty} (Y_{N-1} - Y_{N-m} - 250(m-1))\alpha^{m-1}$$

$$= ((Y_N - Y_{N-1}) - 250) + \alpha L_{N-1}$$

We can now describe the VFS algorithm.
1) Keep the lateness of the last cell $L_{N-1}$ in memory.
2) When the next DS1 cell (cell N) arrives, calculate its lateness $L_N$ by multiplying $L_{N-1}$ by $\alpha=0.99$ and then adding $((Y_N - Y_{N-1}) - 250)$. Store this in $L_N$.
3) When this cell is at the head of the line its current lateness is calculated by adding the waiting time to $L_N$.
4) Finally the lateness of the head of the line cell from each of the DS1 streams is compared and the latest cell (i.e. the cell with the greatest lateness) is sent.

The error in $\hat{b}$ calculated as follows. First there is a bias of $$\frac{(1-\alpha)}{\alpha} \sum_{m=1}^{\infty} dm\alpha^m = (1-\alpha)d \sum_{m=1}^{\infty} m\alpha^{m-1}$$

$$= (1-\alpha)d \frac{1}{(1-\alpha)^2} = \frac{d}{(1-\alpha)}$$

Next the variance of the estimate is $$E\left(\frac{(1-\alpha)}{\alpha} \sum_{m=1}^{\infty} E_m \alpha^m\right)^2 = \frac{(1-\alpha)^2}{\alpha^2} \sum_{m=1}^{\infty} \sigma_E^2 \alpha^{2m}$$

$$= \frac{(1-\alpha)^2}{\alpha^2} \sigma_E^2 \frac{1}{1-\alpha^2} = (1-\alpha)\sigma_E^2 \frac{1}{\alpha^2(1+\alpha)}$$

If we pick $\alpha=0.99$ then the bias of $\hat{b}$ is 100 times d. Since d is at most 250/4000 we get a bias of about 6 microseconds. The standard deviation of $\hat{b}$ will be roughly the square root of 0.01 times the standard deviation of the jitter; that is roughly 0.1 times 50 microsecond or about 5 microseconds. Since the resolution time of the switch is about one time slot or 8 microseconds neither of these errors is significant compared with the size of b which is around 50 microseconds.

As a refinement it is possible to estimate the drift. This is 4000 times smaller than the nominal cell assembly time, but it becomes significant if we wish to decrease the standard deviation of the estimate by taking $\alpha$ closer to 1. Due to the resolution time of the switch it is necessary cell assembly times at every 4000th cell for instance. Since it nominally takes 1 second to assemble 4000 cells define a sequence of backward assembly times $T_m = Y_{4000N} - Y_{4000(N-m)}$. These backward assembly times satisfy a regression equation: $D_m = T_m - m = 4000d \, \epsilon_m$ where $\epsilon$ is the accumulated error of 4000 inter arrival times. The regression estimate for d based on M observations is $$\hat{d} = \sum_{m=1}^{M} (4000m)D_m \Big/ \sum_{m=1}^{M} (4000m)^2$$

$$= \sum_{m=1}^{M} (4000m)D_m / (M(M+1)(2M+1)/6)$$

The variance of this estimate is $$E\left(\sum_{m=1}^{M}(4000m)\varepsilon_m\right)^2 \Big/ \left(\sum_{m=1}^{M}(4000m)^2\right)^2 = \sum_{m=1}^{M}(4000m)^2\sigma_\varepsilon^2 \Big/ \left(\sum_{m=1}^{M}(4000m)^2\right)^2$$

$$= \sigma_\varepsilon^2 \Big/ \sum_{m=1}^{M}(4000m)^2$$

$$= \frac{\sigma_\varepsilon^2}{4000^2} \frac{1}{M(M=1)(2M+1)/6}$$

The standard deviation of ε is 4000 times that of J so the standard deviation of the estimate is around 50 microseconds divided by M to the power 3/2. Since the value of d is around 250/4000 we need to set M at around 86 to reduce the standard deviation of the estimate to the standard deviation of d. This means several minutes to get a good estimate. A linear filter can also be found like the estimate for the jitter.

Figure 3:
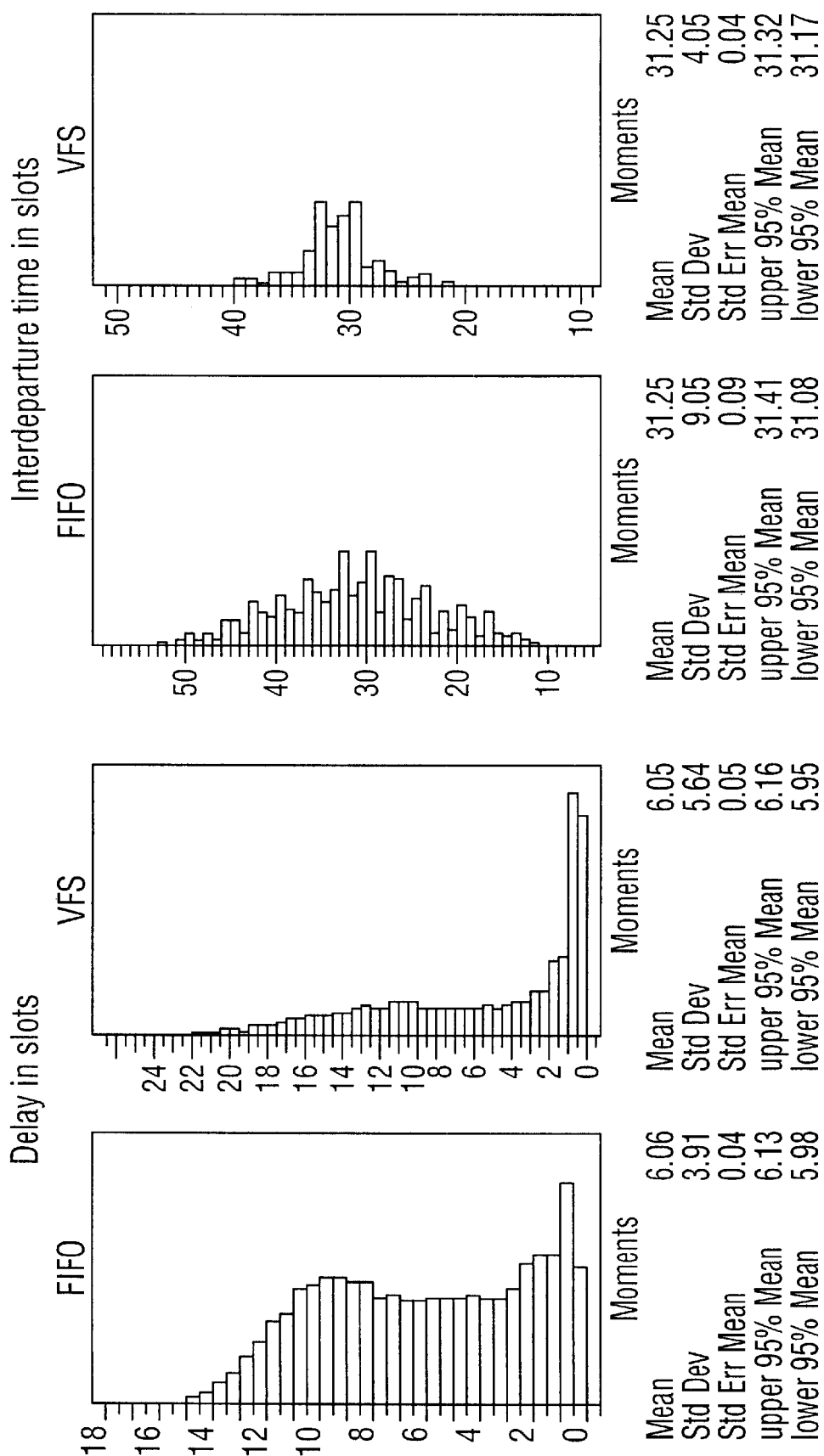
FIG. 3 shows a comparison of transient behaviour between VFS and FIFO schemes (synchronized phase)

In FIG. 3, the results are shown for a transient test when the DS1 streams start off badly synchronized. This means the cell assembly times are initially bunched within an interval of 100 μs. The histogram of the delay is measured in time slots of 8 μs. The histogram of the variation is also given; the variation is the time between departures of cells from the same DS1 and this might be the time between arrivals at the playout buffer. Because both protocols act on the same sequence of cell arrivals the following histograms represent a comparison of the transient behavior of both protocols.

It can be seen in FIG. 2 that the cell delay for VFS is the same as FIFO but the standard deviation has increased slightly. On the other hand the cell variation is much more concentrated around the nominal interarrival time of DS1 cells taken to be T=250 μs or 250/8=31.25 slots. Notice that the size of the play-out buffer is determined by the maximum value of the variation distribution since this determines when the play-out buffer may under flow.

Figure 4:
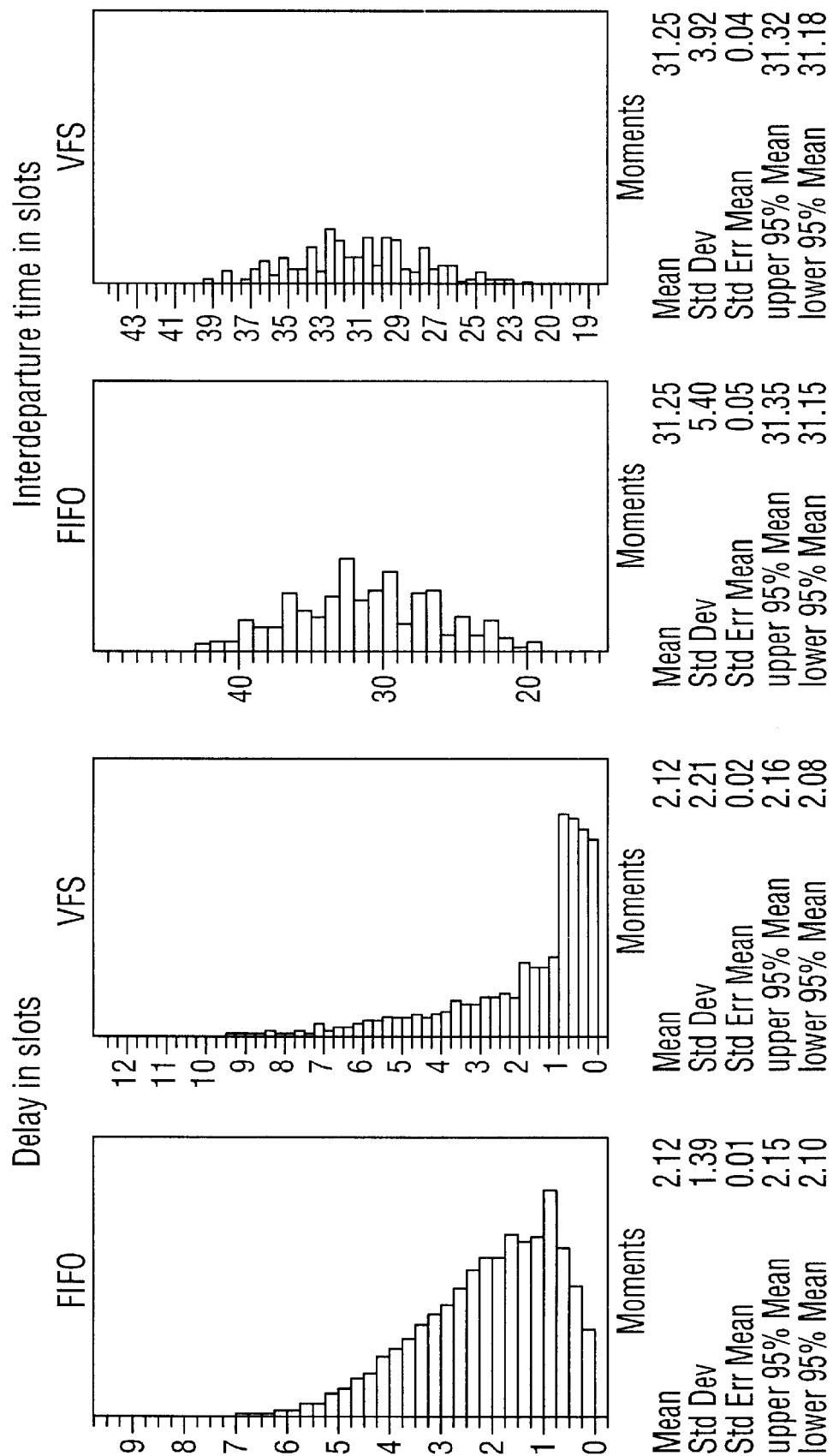
FIG. 4 shows a comparison of transient behaviour between VFS and FIFO schemes (random phase)

FIG. 4 shows the transient performance with the phases of the 28 DS1 streams randomly distributed.

Again the FIFO protocol gives the same cell delay. Again the VFS protocol gives a variation distribution with smaller standard deviation and smaller spread.

The previous simulations were run for only 0.1 seconds. To obtain a comparison of the steady state behavior of the two protocols we next ran for 40 seconds. Again both protocols are applied to the same stream of incoming cells. The results are shown in the following table.

| FIFO (slots) | | VFS (slots) | |
|---|---|---|---|
| delay | interdeparture | delay | interdeparture |
| Mean | SD | Mean | SD | Mean | SD | Mean | SD |
| 2.43 | 1.81 | 31.25 | 5.62 | 2.43 | 2.68 | 31.25 | 3.88 |

Again it can be seen that the mean delay does not increase. The mean variation or mean interdeparture times of the DS1 streams is exactly the nominal value but the standard deviation of the variation is smaller for VFS. There is a small increase in the SD of the cell delay but this does not impact performance.

The above results show that the proposed VFS scheduling scheme consistently out-performs the FIFO scheme in both the transient and steady state tests.

What is claimed is:

1. A method of scheduling cells received at a queueing module provided for each connection into an asynchronous network for a circuit emulation service CES, comprising establishing a virtual clock for each connection by online traffic measurement in real time, estimating the lateness of a head-of-the line cell for each queue relative to a deadline for departure of that cell determined by the established virtual clock by means of a moving window filter able to adapt to a slow drift in the virtual clock and at the same time smooth cell delay variations between successive cells caused by jitter due to cell contention, and giving highest priority for transmission to a cell having a largest lateness value.

2. A method as claimed in claim 1, wherein said moving window filter is an exponential moving window filter wherein the relative lateness of the $n^{th}$ cell, $L_N$, is estimated recursively as $L_N=D_N+\alpha L_{N-1}$, where $D_N$ is the timing deviation for an individual cell N relative to a nominal value and a is a parameter that determines the effective window size of the moving filter.

3. A method as claimed in claim 2, wherein the timing deviation is determined when the cell arrives.

4. A method as claimed in claim 3, wherein the relative lateness of the last cell $L_{N-1}$, is kept in per-connection memory when the next cell N arrives, its lateness $L_N$ is calculated by multiplying $L_{N-1}$ by α and then adding $((a_N-a_{N-1})-T)$, where T denotes the nominal cell assembly or transmission time, t is the current clock time and $a_N$ is the cell arrival time, $L_N$ and $a_N$ are stored in a per-cell memory, the per connection memory is updated with $L_N$ when this cell is at the head of the line, its current lateness is calculated by adding the waiting time to $L_N$, giving $(L_N+(t-a_N))$, and then the head-of-the-line cell from the CES stream is transmitted.

5. A method as claimed in claim 2, wherein the timing deviation is determinded when the cell is scheduled for departure.

6. A method as claimed in claim 4, wherein the relative lateness $L_{N-1}$ and the departure time $d_{N-1}$ of the last cell at the head of line are kept in per-connection memory, when the next cell N is at the head of line position, the lateness $L'_N=\alpha L_{N-1}-d_{N-1}-T$ for this connection is stored, the stream with the largest lateness value is transmitted, the per cell memory storing lateness for this stream is updated with $L_N=t+L'_N$, and the departure time of this stream is updated with $d_N=t$.

7. A device for scheduling cells into an asynchronous network for proving a circuit emulation service CBS, comprising a queueing module for each connection receiving incoming cells, a relative lateness estimator connected to said queueing module for estimating the relative lateness on a per connection basis of a head-of-the line cell for each queue relative to a deadline for departure of that cell determined by a virtual clock established for that connection by means of a moving window filter able to adapt to slow drift in virtual clock and at the same time smooth cell delay variations between successive cells caused by jitter due to cell contention, and an earliest-deadline-first scheduler connected to said lateness estimator for transmitting outgoing cells and giving highest priority to a cell having a largest lateness value.

8. A device as claimed in claim 7, wherein said moving window filter estimates the relative lateness recursively in accordance with the equation $$L_N=D_N+\alpha L_{N-1}$$

where $L_N$ is the relative lateness of the nth cell and $D_N$ is the time deviation for the cell N, and α is a parameter that determines the effective window size of the moving window filter.

9. A device as claimed in claim 7, wherein said relative lateness estimator is connected to a per connection memory for storing the relative lateness of the last cell for each connection.

10. A device as claimed in claim 7, wherein said asynchronous network is an ATM network.

11. A device as claimed in claim 7, wherein said device is implemented in a traffic shaper.

12. A device as claimed in claim 7, wherein said device is implemented in a Segmentation and Reassembly (SAR) device.

* * * * *